US006115129A

United States Patent [19]

Holmquist et al.

[11] Patent Number: 6,115,129

[45] Date of Patent: Sep. 5, 2000

[54] LASER GUIDED LOADING SYSTEM

[75] Inventors: John Richard Holmquist, Federal Way; Wesley Edward Grenlund, Edgewood, both of Wash.

[73] Assignee: Weyerhaeuser Company, Federal Way, Wash.

[21] Appl. No.: 09/205,451

[22] Filed: Dec. 4, 1998

[51] Int. Cl.[7] .................................................... G01B 11/14

[52] U.S. Cl. ............................................................ 356/375

[58] Field of Search .................................... 356/3.1, 3.11, 356/3.12, 372, 375

[56] References Cited

U.S. PATENT DOCUMENTS

| | | | |
|---|---|---|---|
| 2,732,957 | 1/1956 | Horner . | |
| 2,858,009 | 10/1958 | Bainbridge . | |
| 3,217,592 | 11/1965 | Braun et al. . | |
| 3,693,143 | 9/1972 | Kennedy | 356/3.11 |
| 3,716,147 | 2/1973 | Pipes . | |
| 3,901,392 | 8/1975 | Streckert . | |
| 4,723,884 | 2/1988 | Brinker et al. . | |
| 4,888,490 | 12/1989 | Bass et al. . | |
| 5,222,861 | 6/1993 | Focke et al. . | |
| 5,284,416 | 2/1994 | Schmidt et al. . | |
| 5,335,308 | 8/1994 | Sorensen . | |

*Primary Examiner*—Frank G. Font
*Assistant Examiner*—Amanda Merlino
*Attorney, Agent, or Firm*—Christensen O'Connor Johnson & Kindness PLLC

[57] ABSTRACT

To accurately position cargo above a surface, the present invention utilizes a pair of lasers positioned on a cargo pick-up unit that are aligned to produce beam lines that intersect at a known height, h, below the bottom surface of the cargo. As the cargo is lowered onto the surface, the laser lines appear to move towards each other. When the laser lines overlap, an operator knows the cargo is positioned at the height, h, above the surface. To provide an indication of the distance between the cargo and a bulkhead, a laser is positioned at either end of the pick up unit. The laser is aligned to create a diagonal laser line ahead of the cargo. As the pick-up unit approaches the bulkhead, the laser line appears to climb vertically on the bulkhead. When the laser line is shown completely on the bulkhead with no component on the surface below the cargo, the operator knows that the cargo is at a predefined distance, d, away from the bulkhead.

4 Claims, 3 Drawing Sheets

LASER GUIDED LOADING SYSTEM

FIELD OF THE INVENTION

The present invention relates to proximity sensing devices in general, and in particular to systems for loading and unloading cargo in ship holds.

BACKGROUND OF THE INVENTION

In the process of transporting finished goods from a point of manufacture to a purchaser, it is generally inevitable that some damage will occur. The most common cause of such damage occurs during the loading and unloading of goods for transportation.

One industry in which it is desirable to reduce the damage caused to finished goods is in the shipping of paper products. Bulk paper rolls are most often transported via cargo ships from the mill in which they are made to their destination. To load the rolls into the ship's various holds, a crane operator picks up the rolls with a vacuum pick-up unit and lowers the rolls into position within the hold. In many instances, the crane operator is more than 150 feet above the floor of the hold and it is difficult for the operator to accurately gauge the position of the rolls above the hold floor. As a result, many rolls are inadvertently damaged because the crane operator lowers them too fast onto the hold floor or onto an existing layer of rolls in the hold.

A similar problem occurs when the cargo is moved horizontally within the hold. Because the operator cannot accurately gauge the distance between the rolls and the bulkhead of the ship, the rolls can be damaged as they are placed in position for transport.

Various mechanisms have been proposed to provide the crane operator with feedback concerning the relative position of the cargo and the hold. For example, closed-circuit television cameras or ultrasound schemes have been proposed to provide the crane operator with information concerning the position of the cargo relative to the hold or other stored cargo. However, such schemes have not proven workable because the operator is too busy to focus on a television screen or other gauge that provides the distance information.

To reduce damage to cargo, there is a need for a system that can provide a crane operator with the required feedback needed to accurately place cargo within a hold without requiring that the operator view extraneous sensors or monitors.

SUMMARY OF THE INVENTION

To reduce the likelihood of damage as cargo is loaded into a transportation vessel, the present invention is a laser alignment system that provides an operator with a visual indication of the distance that cargo is above a surface and a distance that cargo is away from a bulkhead. To gauge the distance above a surface, the present invention includes a pair of lasers that are positioned on a cargo pick-up unit. The lasers are aligned such that they produce beam lines that cross at a known distance, h, below the bottom surface of the cargo. As the cargo is being lowered, the lasers produce lines on the surface which appear to move together. As the lines come together to form a single line, the operator knows the cargo is at the predetermined distance, h, above the surface.

To gauge the distance between the cargo and a bullhead, a laser is aligned such that it produces a laser line on the surface below the cargo. The laser is aligned such that as the cargo is moved towards the bulldhead, the laser line appears to move vertically on the bulkhead. Once the line appears completely on the bulkhead, with no component on the surface below the cargo, the operator knows that the cargo is at a fixed distance, d, away from the bulkhead.

The present invention is intuitive for the operator to learn and does not require that the operator monitor a dedicated video monitor or sensor.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a system for accurately positioning cargo in a ship's hold in a manner that does not require a crane operator to watch a dedicated video monitor or a sensor.

Figure 1:
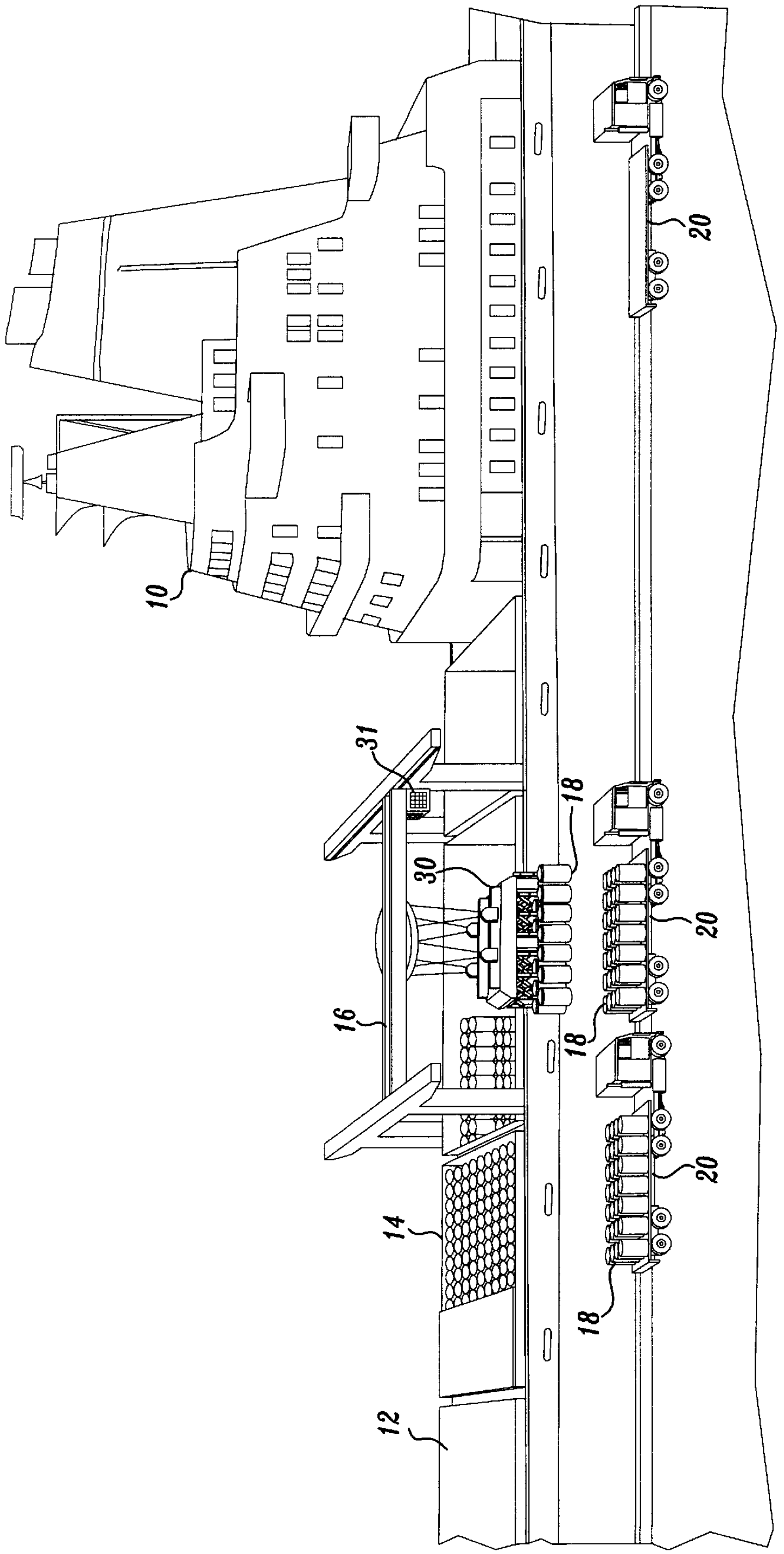
FIG. 1 illustrates a cargo loading system in which the present invention is used.

FIG. 1 illustrates one environment in which the present invention can be used to reduce damage to cargo. In this environment, a cargo ship 10 includes a number of holds 12, 14, 16 into which products are placed for transportation. In the example shown, the cargo comprises rolls of paper 18 that are delivered along side the ship on a number of flatbed trucks 20. The paper rolls 18 are picked up by a vacuum pick-up 30 and are lowered into the hold for transportation. The pickup unit 30 includes a number of vacuum heads 32 that support the individual rolls of paper 34 as they are being positioned within a cargo hold. The pick-up unit 30 is controlled by a crane operator 31. As indicated above, the crane operator may be as high as one hundred and fifty feet above the floor of the cargo hold. Therefore, it is difficult for the crane operator to accurately gauge the distance of the cargo above the bottom of the hold and as such, it is difficult to determine when the cargo will engage the hold floor or the ship's bulkheads as the cargo is being positioned for transport.

Figure 2:
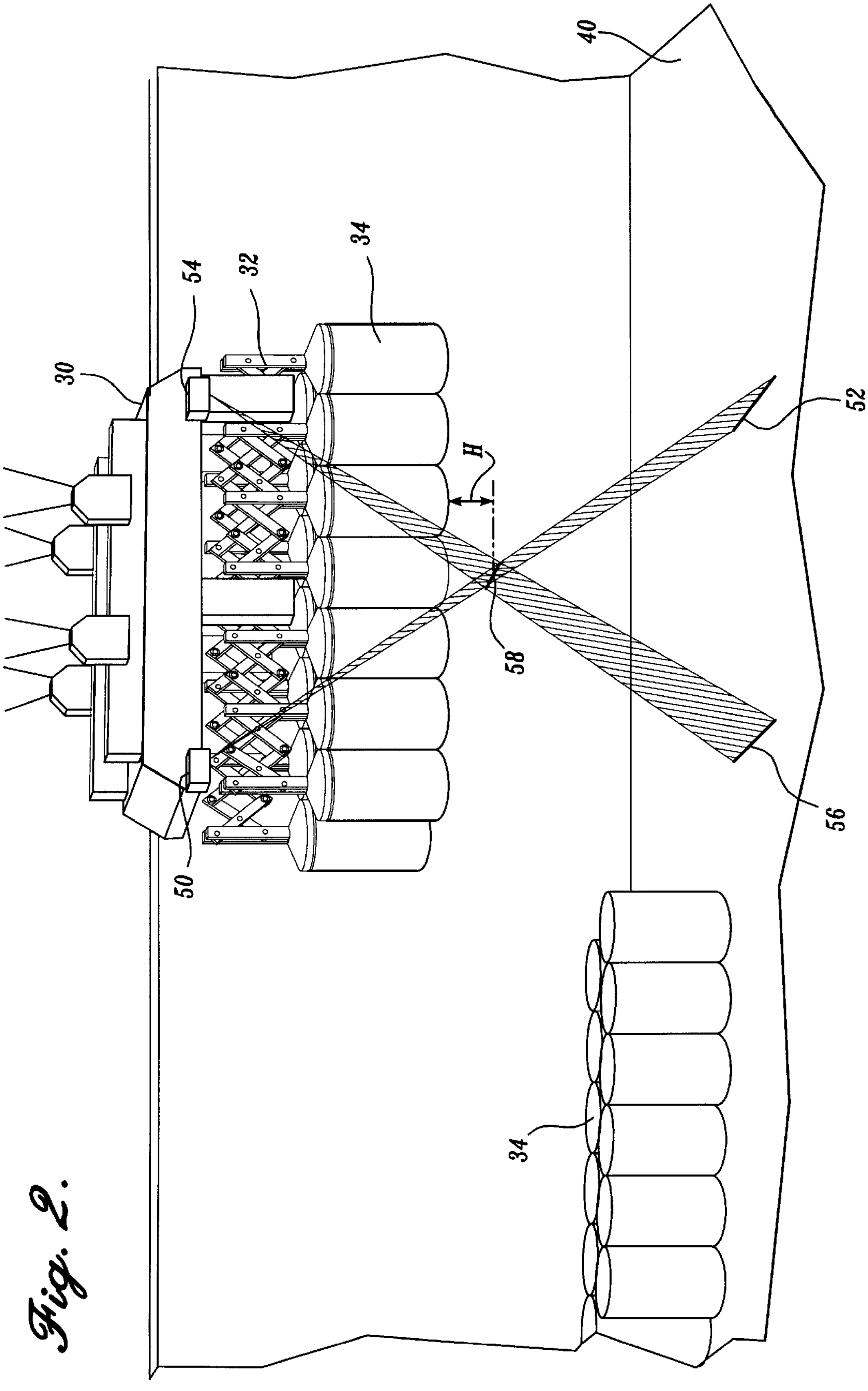
FIG. 2 illustrates a laser guided system for vertically positioning cargo in a ship's hold according to the present invention.

FIG. 2 illustrates a system for providing an indication of the height of a cargo load above a surface according to the present invention.

To provide an indication of the height of the cargo above a surface (i.e., either the hold floor or a layer of rolls that have already been placed in the hold), the present invention utilizes a pair of lasers that are secured to the pickup unit 30. A housing 50 is secured to one end of the pickup unit 30 and holds a line laser that creates a laser line 52 on the hold floor 40 or other surface onto which the cargo is to be placed. Similarly, a housing 54 positioned at some distance away from the housing 50 on the pick-up unit and holds a laser that produces a laser line 56. The lasers in the housings 50 and 54 are aligned such that the laser lines that are oriented perpendicular to the length of the pick up unit. The laser lines cross at a known distance, h, below the bottom surface of the paper rolls 20 (or other types of cargo).

As the pickup unit 30 is being lowered by the crane operator, the laser lines 52 and 56 appearing on the cargo hold floor 40 will appear to move towards each other until they overlap and become a single line 58. At this point, the operator knows that the cargo is at the defined height, h, above the cargo hold floor. The operator can then slow the descent of the pickup unit 30 and gently set the paper rolls 20 on the cargo hold floor 40.

In the presently preferred embodiment of the invention, the lasers used are line lasers model No. FAY-1L3-1HS available from Diode Laser Concepts of Hubbard, Ore. These lasers can be seen in bright ambient light. These lasers produce approximately 10° laser lines. The benefit of using a line laser is that the laser light can be easily seen from the operator's station even over irregular surfaces. Therefore, the present invention can be used to accurately determine the height of the cargo over another layer of paper rolls.

As indicated above, the lasers are aligned such that the laser lines they produce cross at a known distance below the bottom surface of the cargo. To accommodate the loading of different sized paper rolls, each of the housings 50 and 54 contain several lasers that are aligned such that the beam lines they produce cross at different positions. In the presently preferred embodiment of the invention, each of the housings 50, 54 contain three lasers that are aligned to produce laser beam lines that cross twelve inches below a 36, 42 or 76-inch-wide paper roll. A switch positioned in either the crane operator's cabin or at another location on the ship is used to activate the proper pair of lasers for the height of the paper rolls that are being loaded into the ship.

While the embodiment shown in FIG. 2 provides an indication of the height of the cargo above a surface, it does not aid in allowing the operator to move the cargo horizontally within the shipping hold. Therefore, the present invention also utilizes additional lasers that are secured at the ends of the pickup unit 30.

Figure 3:
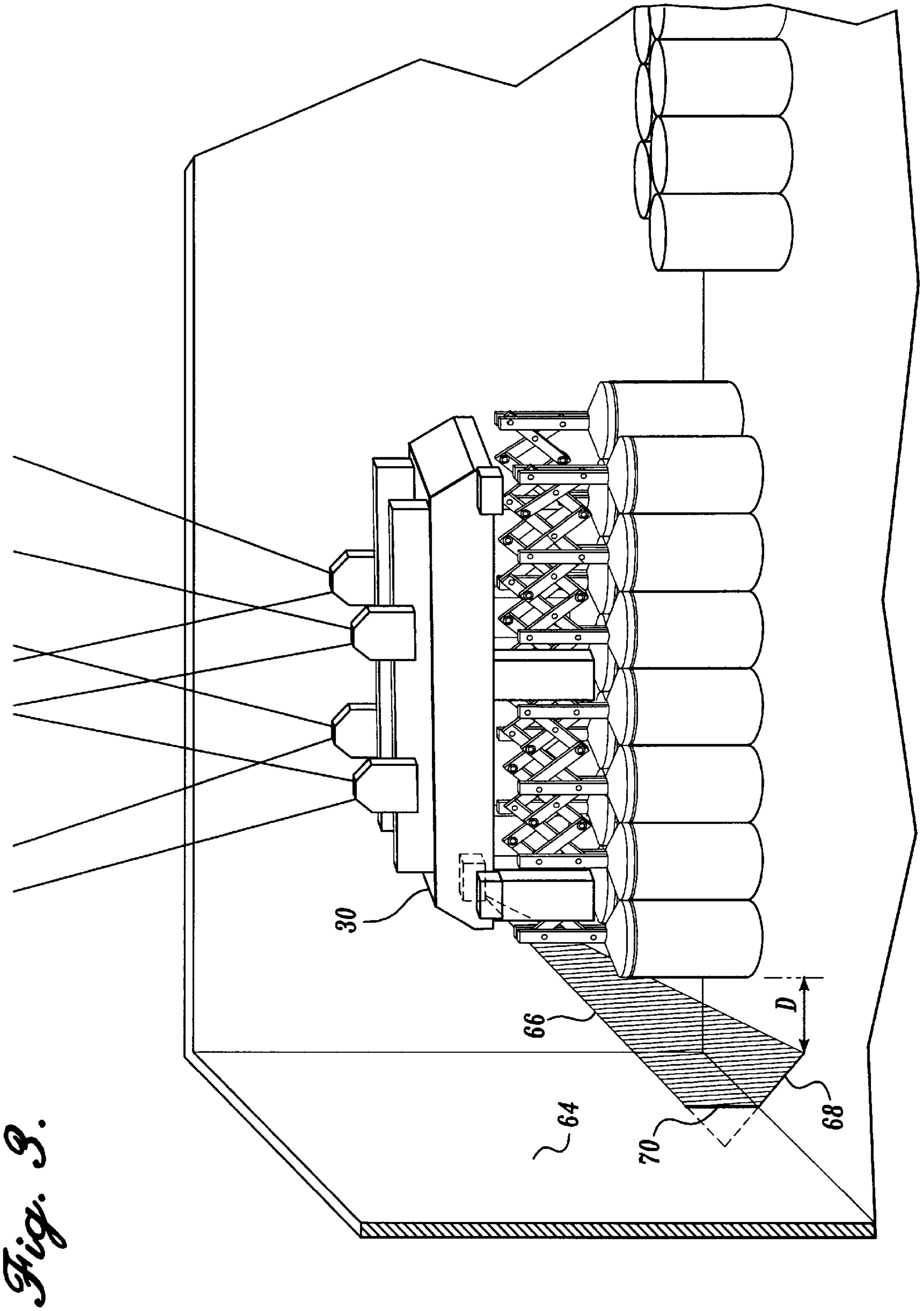
FIG. 3 illustrates a laser guided system for horizontally positioning cargo in a ship's hold according to the present invention.

As illustrated in FIG. 3, in order to gauge the horizontal distance, d, between the pickup unit 30 and a bulkhead 64, the present invention includes a line laser that produces a laser beam 66. When the pickup unit 30 is a distance that is greater than the predefined distance, d, from the bulkhead, the laser beam 66 appears as a diagonal line 68 on the surface below the cargo. However, as the pickup unit 30 is moved closer to the bulkhead 64, the bulkhead intercepts the laser beam 66 thereby creating a line 70 that appears to grow vertically on the bulkhead 64. The alignment of the laser is set such that when the laser beam appears as a vertical line 70 on the bulkhead with no component 68 on the surface below the cargo, the pickup unit 30 is 8 inches away from the bulkhead. Therefore, the operator can slow the movement of the pickup unit and gently position the cargo in its proper place.

In the present embodiment of the invention, the lasers must be protected from the harsh marine environment. Therefore, the housings 50, 54 described above as well as the housings that hold the lasers on either end of the pick-up unit are made of stainless steel and are watertight. The individual lasers are secured in the housings, with a bracket having multi-axis adjustment and separate set screws such that the lasers can be removed and replaced without affecting the alignment.

Although the present invention has been described with respect to loading paper rolls in a ship's cargo hold, it will be appreciated that the present invention can be used in any environment where an operator cannot accurately see the position at which an object is being placed. Using the present invention, it has been found that damage to cargo is reduced and the speed of loading is increased. With the present invention, the crane operator does not have to monitor an extraneous sensor display or a dedicated TV monitor. In addition, the relative movement of the laser lines coming together as the final position of the crane is reached is intuitively understood, thereby making the invention easy to learn and use.

The embodiments of the invention in which an exclusive property or privilege is claimed are defined as follows:

1. A system for producing an indication of the position of cargo in a container comprising:

a pair of lasers secured to a pick-up unit that moves the cargo, the pair of lasers producing laser lines oriented generally perpendicular to the length of the pick-up unit, the laser lines crossing at a pre-defined distance below a bottom surface of the cargo wherein the pick-up unit is lowered until the laser lines appear to overlap at which time an operator knows the cargo is at the predefined distance above a surface; and a laser secured to the pick-up unit and positioned to produce an indication of a horizontal distance between the pick-up unit and a wall, the laser being oriented such that it produces a laser line wherein the wall intercepts the laser line as the pick up unit is moved towards the wall, wherein the pick-up unit is a predefined distance away from the wall when the laser line appears completely on the wall.

2. The system of claim 1, further including multiple pairs of lasers that produce laser lines that cross at different positions in order to mark a known distance below cargo of different dimensions.

3. The system of claim 1, wherein the container is a cargo hold of a ship.

4. The system of claim 1, wherein the cargo are rolls of paper.

* * * * *